US010503658B2

(12) United States Patent
Basu et al.

(10) Patent No.: US 10,503,658 B2
(45) Date of Patent: Dec. 10, 2019

(54) PAGE MIGRATION WITH VARYING GRANULARITY

(71) Applicant: Advanced Micro Devices, Inc., Sunnyvale, CA (US)

(72) Inventors: Arkaprava Basu, Austin, TX (US); Jee Ho Ryoo, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 10 days.

(21) Appl. No.: 15/499,313

(22) Filed: Apr. 27, 2017

(65) Prior Publication Data

US 2018/0314436 A1     Nov. 1, 2018

(51) Int. Cl.
    *G06F 12/1009*  (2016.01)
    *G06F 12/1027*  (2016.01)
    *G06F 11/34*    (2006.01)

(52) U.S. Cl.
    CPC .......... *G06F 12/1009* (2013.01); *G06F 11/34* (2013.01); *G06F 12/1027* (2013.01); *G06F 2212/1024* (2013.01); *G06F 2212/205* (2013.01); *G06F 2212/502* (2013.01); *G06F 2212/601* (2013.01); *G06F 2212/65* (2013.01); *G06F 2212/657* (2013.01); *G06F 2212/683* (2013.01)

(58) Field of Classification Search
    CPC .. G06F 12/10–12/109; G06F 2212/205; G06F 2212/254; G06F 2212/2542; G06F 2212/683
    See application file for complete search history.

(56) References Cited

U.S. PATENT DOCUMENTS

| 5,125,086 A *    | 6/1992  | Perazzoli, Jr. .......... G06F 12/08 711/159 |
| 5,727,150 A      | 3/1998  | Laudon et al. |
| 9,535,831 B2     | 1/2017  | Jayasena et al. |
| 2007/0283123 A1* | 12/2007 | Vick ................... G06F 12/0284 711/207 |
| 2011/0066790 A1* | 3/2011  | Mogul ................. G06F 12/023 711/103 |

(Continued)

OTHER PUBLICATIONS

Agarwal et al. "Unlocking Bandwidth for GPUs in CC-NUMA Systems." Feb. 2015. IEEE. HPCA '15. pp. 354-365.*

(Continued)

*Primary Examiner* — Nathan Sadler
(74) *Attorney, Agent, or Firm* — Volpe and Koenig, P.C.

(57) ABSTRACT

The present disclosure is directed to techniques for migrating data between heterogeneous memories in a computing system. More specifically, the techniques involve migrating data between a memory having better access characteristics (e.g., lower latency but greater capacity) and a memory having worse access characteristics (e.g., higher latency but lower capacity). Migrations occur with a variable migration granularity. A migration granularity specifies a number of memory pages, having virtual addresses that are contiguous in virtual address space, that are migrated in a single migration operation. A history-based technique that adjusts migration granularity based on the history of memory utilization by an application is provided. A profiling-based technique that adjusts migration granularity based on a profiling operation is also provided.

20 Claims, 7 Drawing Sheets

(56) References Cited

U.S. PATENT DOCUMENTS

| | | | | |
|---|---|---|---|---|
| 2012/0079232 | A1* | 3/2012 | Hinton | G06F 12/0292 |
| | | | | 711/207 |
| 2014/0281323 | A1* | 9/2014 | Duluk, Jr. | G06F 12/1009 |
| | | | | 711/165 |
| 2017/0371777 | A1* | 12/2017 | Kim | G06F 12/023 |

OTHER PUBLICATIONS

Anthony Garreffa. "How much VRAM do you really need at 1080p, 1440p and 4K?" Jun. 2015. https://www.tweaktown.com/tweakipedia/89/much-vram-need-1080p-1440p-4k/index.html.*

Meswani et al. "Heterogeneous Memory Architectures: A HW/SW Approach for Mixing Die-stacked and Off-package Memories." Feb. 2015. IEEE. HPCA '15. pp. 126-136.*

Agarwal et al. "Thermostat: Application-transparent Page Management for Two-tiered Main Memory." Apr. 2017. ACM. ASPLOS '17.*

Papathanasiou et al. "Energy Efficient Prefetching and Caching." Jul. 2004. USENIX. 2004 USENIX ATC.*

Meswani, M. et al, "Heterogeneous memory architectures: A HW/SW approach for mixing die-stacked and off-package memories", 2015 IEEE 21st International Symposium on High Performance Computer Architecture, Feb. 7-11, 2015, pp. 126-136, IEEE, San Francisco, CA, USA.

Oskin, M. et al., "A Software-managed Approach to Die-stacked DRAM", Proceedings of the 2015 International Conference on Parallel Architecture and Compilation, Oct. 18-21, 2015, pp. 188-200, IEEE, San Francisco, CA, USA.

Lin, F. et al., "memif: Towards Programming Heterogeneous Memory Asynchronously", Proceedings of the 21st International Conference on Architectural Support for Programming Languages and Operating Systems, Apr. 2-6, 2016, pp. 369-383, ACM, Atlanta, GA, USA.

Intel Corporation, "3D XPoint Unveiled—The Next Breakthrough in Memory Technology", Jul. 30, 2015 (available at: https://web-beta.archive.org/web/20150730225323/http://www.intel.com/content/www/us/en/architecture-and-technology/3d-xpoint-unveiled-video.html).

Goglin, B. et al., "Enabling High-Performance Memory Migration for Multithreaded Applications on Linux", IEEE International Symposium on Parallel & Distributed Processing, May 23-29, 2009, 17 pgs., IEEE, Rome, Italy.

* cited by examiner

PAGE MIGRATION WITH VARYING GRANULARITY

TECHNICAL FIELD

The disclosed embodiments are generally directed to computer memory, and in particular, to page migration with varying granularity.

BACKGROUND

Recently, a large number of different types of computer memory technologies have been developed. These different computer memories have different characteristics, such as different capacity, available bandwidth, latency, and so on. Managing processing workloads, including where to store data for the processing workloads, is a complex task that is constantly being improved.

BRIEF DESCRIPTION OF THE DRAWINGS

A more detailed understanding may be had from the following description, given by way of example in conjunction with the accompanying drawings wherein.

DETAILED DESCRIPTION

The present disclosure is directed to techniques for migrating data between heterogeneous memories in a computing system. More specifically, the techniques involve migrating data between a memory having better access characteristics (e.g., lower latency but greater capacity) and a memory having worse access characteristics (e.g., higher latency but lower capacity). Migrations occur with a variable migration granularity. A migration granularity specifies a number of memory pages, having virtual addresses that are contiguous in virtual address space, that are migrated in a single migration operation. A history-based technique that adjusts migration granularity based on the history of memory utilization by an application is provided. A profiling-based technique that adjusts migration granularity based on a profiling operation is also provided.

Figure 1:
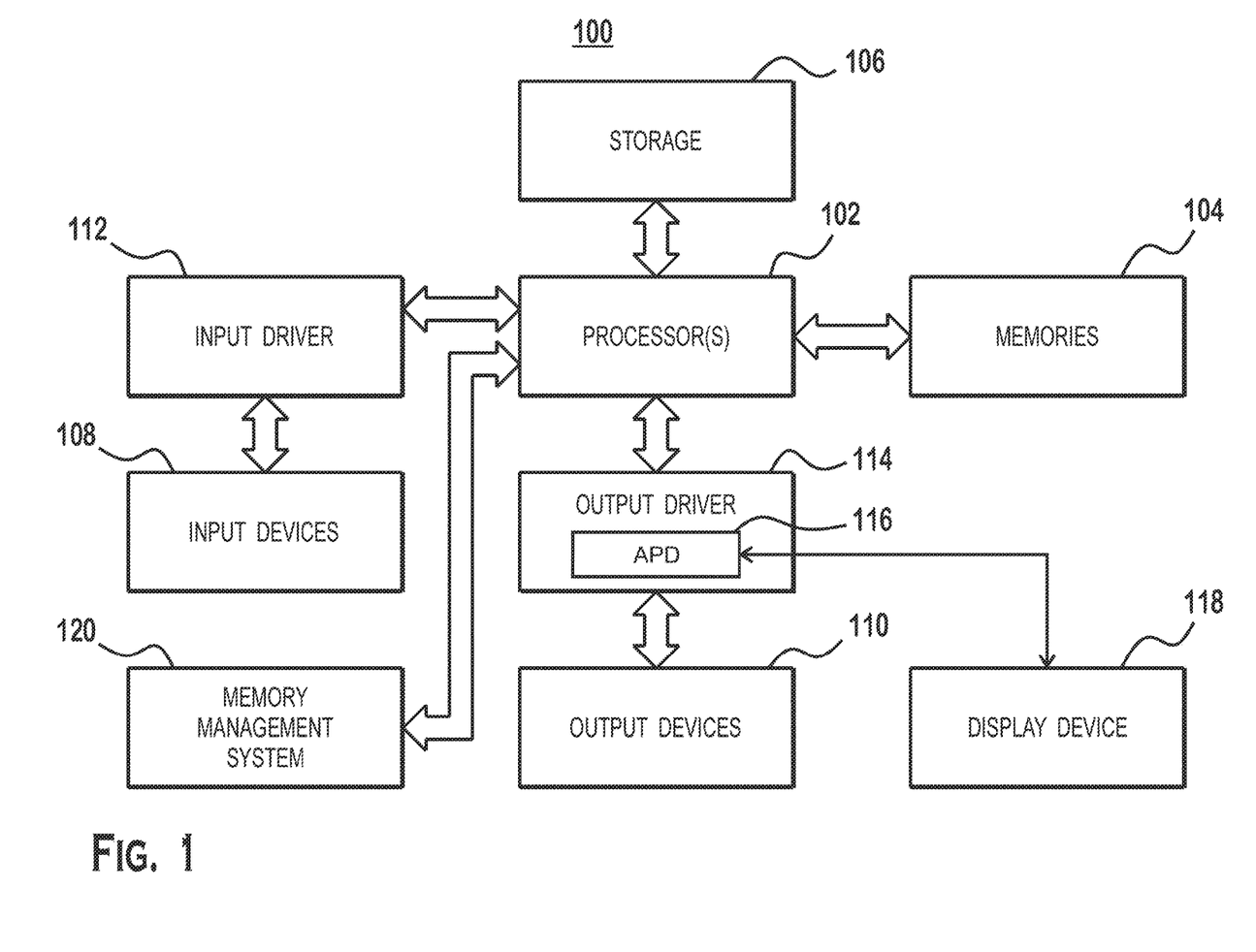
FIG. 1 is a block diagram of an example device in which one or more disclosed embodiments may be implemented.

FIG. 1 is a block diagram of an example device 100 in which one or more aspects of the present disclosure are implemented. The device 100 includes, for example, a computer, a gaming device, a handheld device, a set-top box, a television, a mobile phone, or a tablet computer. The device 100 includes a processor 102, a memory 104, a storage device 106, one or more input devices 108, and one or more output devices 110. The device 100 also includes an input driver 112 and an output driver 114. It is understood that the device 100 may include additional components not shown in FIG. 1.

The processor 102 includes a central processing unit (CPU), a graphics processing unit (GPU), a CPU and GPU located on the same die, or one or more processor cores, wherein each processor core may be a CPU or a GPU. The memory 104 is located on the same die as the processor 102, or may be located separately from the processor 102. The memory 104 includes a volatile or non-volatile memory. In various examples, the memory 104 includes processor caches and main memory. Main memory includes one or more of different types of memory technologies such as dynamic random access memory ("DRAM"), high-bandwidth memory, and non-volatile memory technologies like phase-change memory. Each of these different types of main memories has different characteristics such as different capacity, access latency, and energy characteristics.

The storage device 106 includes a fixed or removable storage, for example, a hard disk drive, a solid state drive, an optical disk, or a flash drive. The input devices 108 include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. The output driver 114 includes an accelerated processing device (APD) 116 which is coupled to a display device 118. The APD is configured to accept compute commands and graphics rendering commands from processor 102, to process those compute and graphics rendering commands, and to provide pixel output to display device 118 for display.

Although a specific number of the elements listed above (e.g., processor 102, memory 104, or the like) is illustrated in FIG. 1, it should be understood that the teachings provided herein apply for implementations of the device 100 that include more or less than the specific number of elements illustrated.

Figure 2:
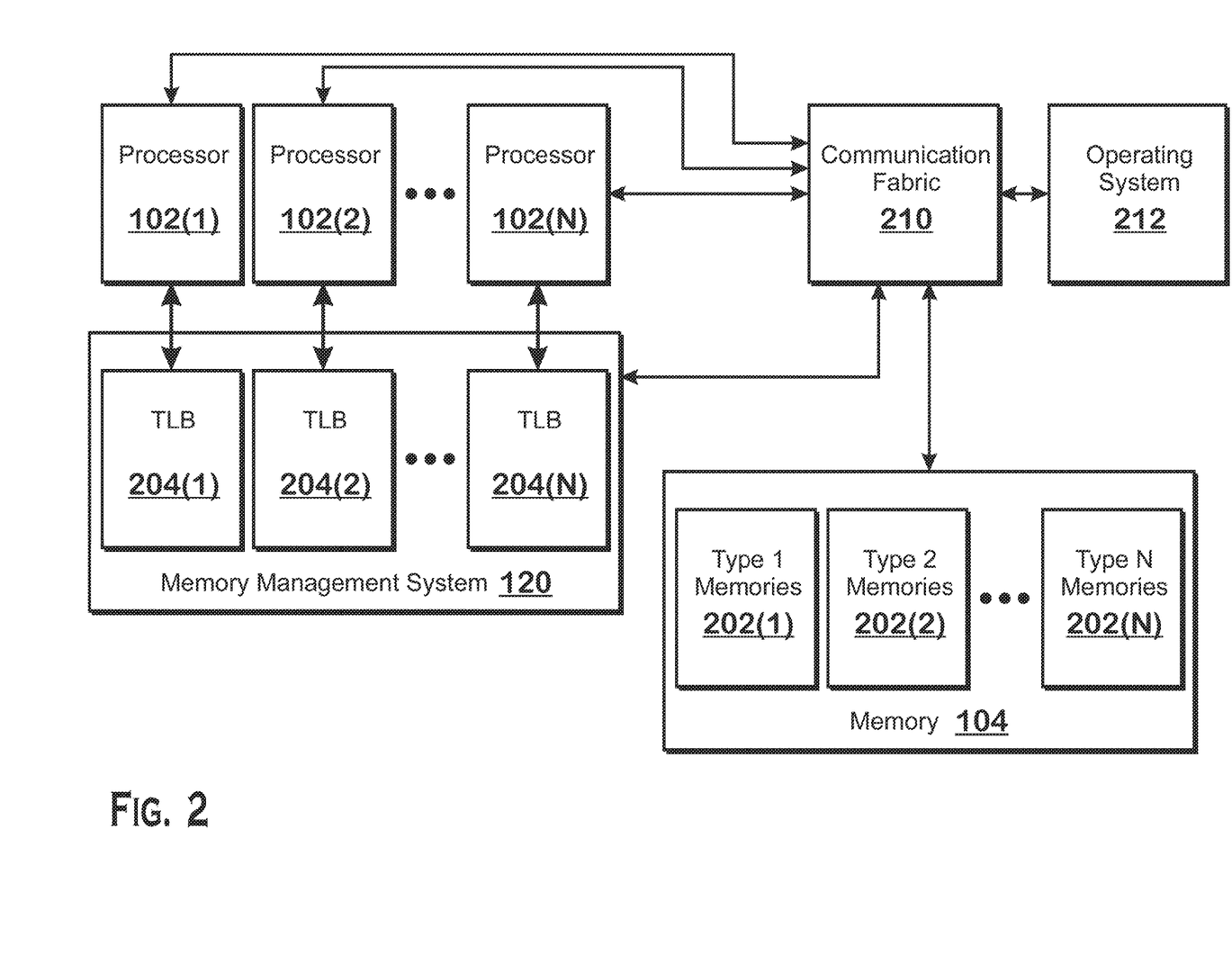
FIG. 2 is a block diagram illustrating aspects of a memory management system of the device of FIG. 1, according to an example.

FIG. 2 is a block diagram illustrating aspects of the memory management system 120 of the computer system 100, according to an example. The memory management system 120, memory 104, and several processors 102 are shown. In addition, a communication fabric 210 and an operating system 212 are shown. The communication fabric 210 comprises a single communication mechanism or combination of communication mechanisms (such as buses) configured to facilitate communication between the processors 102, memory management system 120, memory 104, and operating system 212. The operating system 212 executes on one of the processors 102 or on another processor not shown and controls various operations for the device 100, including memory-related operations.

The memory management system 120 includes translation lookaside buffers ("TLBs") 204 that cache virtual-to-physical memory address translations for use by the processors 102. Virtual memory is a mechanism for providing security, isolation, protection, and the impression of having a larger memory space than actually exists to applications, as well as permitting applications to be compiled once and run on platforms with different memory configurations. More specifically, applications access memory using virtual addresses, rather than physical addresses, and the memory management system 120 translates the virtual addresses to physical addresses in order to perform the memory access requested by the applications. This process obscures the physical addresses from the applications, thereby preventing malicious or unintended access to data belonging to another application or the operating system 212.

The TLBs 204 cache a limited set of virtual-to-physical address translations. A larger set of virtual-to-physical address translations are stored in page tables (not shown). The memory management system 120 manages which translations are stored in TLBs 204 based on memory accesses made by the applications. In one example, the memory management system 120 transfers virtual-to-physical address translations from the page tables (or a higher level cache than the TLB 204) into a TLB 204 upon determining that such translations are likely to be used. In one example, a cache miss in a TLB 204 causes the memory management system 120 to fetch an address translation into the TLB 204 for the memory access that caused the cache miss. In FIG. 2, each processor 102 is associated with a different TLB 204, and each TLB 204 performs address translations for a respective processor 102, but those of skill in the art will understand that the teachings provided herein apply to configurations other than such a one-to-one correlation.

The memory 104 includes multiple memories 202, which may each have similar or different characteristics. These memories 202 are shown grouped by "type." Memories of different types have different access characteristics. For example, some memories 202 have greater capacity but higher latency and some memories 202 have lower capacity but lower latency. Examples of different types of memories include phase change memories, spin-transfer torque random access memory ("STT-RAM"), memristor, High Bandwidth Memory ("HBM"), dynamic random access memory ("DRAM"), and non-volatile memory ("NVM"). In general, HBM has relatively small capacity compared to DRAM but has much higher bandwidth. PCM has relatively larger capacity than DRAM but also has higher latency.

The operating system 212 configures at least two different types of memories 202 in a configuration in which at least two of the memory types have a relationship where one type has greater capacity but worse access characteristics (e.g., greater latency and/or lower bandwidth) and the other type has lower capacity but better access characteristics. The operating system migrates data between the two memory types 202 to improve performance for data determined as likely to benefit from such migration. More specifically, upon determining that data stored in a memory having worse access characteristics is requested to be used (or is likely to be requested to be used) by a processor 102, the operating system 212 migrates that data to a memory having better access characteristics. If no space is available in the memory having the better access characteristics, then the operating system 212 selects data from that memory to move to the memory having worse characteristics.

Figure 3:
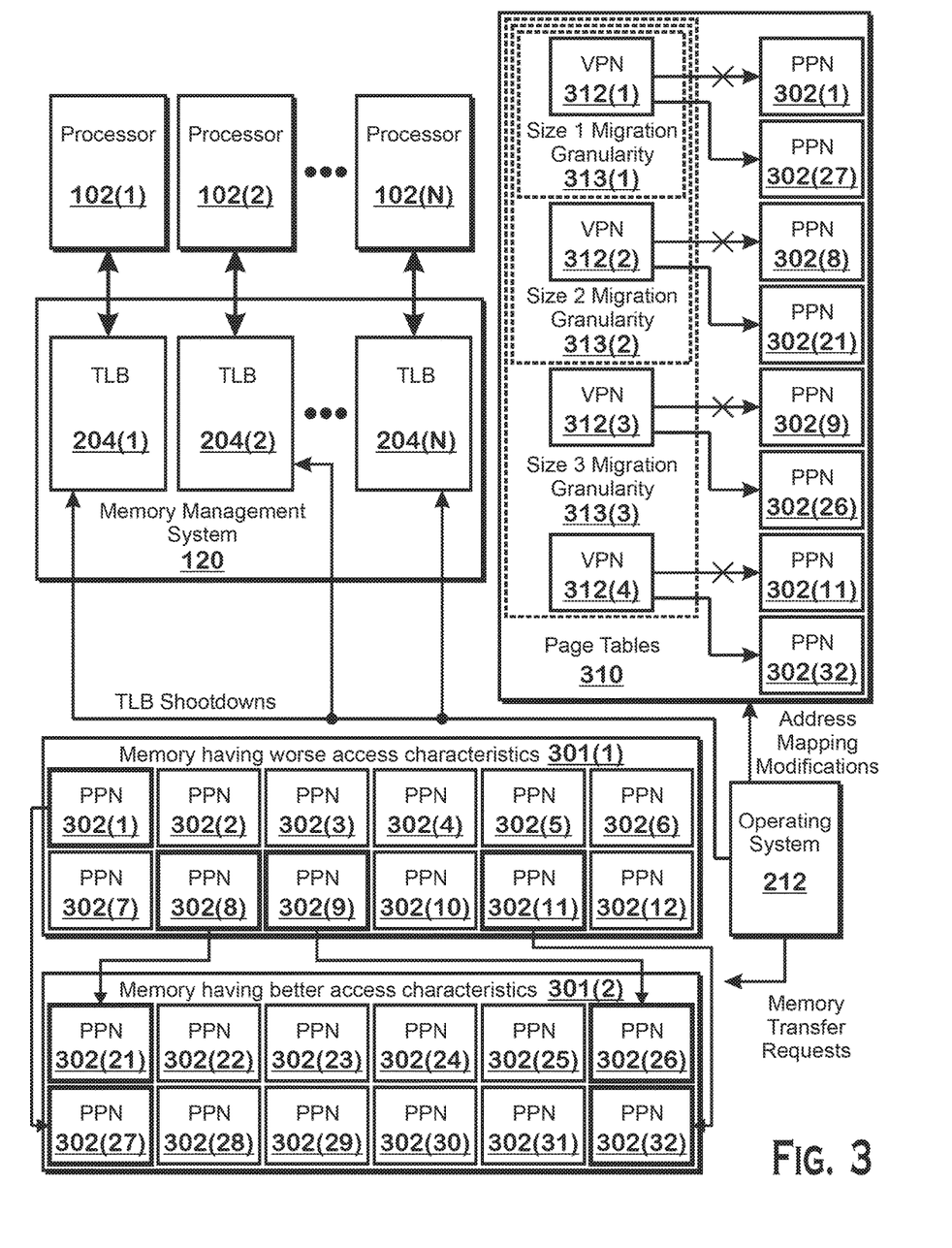
FIG. 3 illustrates details related to migrating data within the system of FIG. 1, according to an example.

FIG. 3 illustrates additional details related to migrating data, according to an example. In FIG. 3, a memory having worse access characteristics 301(1) and a memory having better access characteristics 301(2) are shown. The memories 301 illustrated may be any of the memories 202 illustrated in FIG. 2. The page tables 310, which are managed by the operating system 212, store translations from virtual page numbers ("VPNs") 312 to physical page numbers ("PPNs") 302. Herein, a memory having better access characteristics 301(2) has one or more of lower latency, greater bandwidth, or lower access energy than a memory having worse access characteristics 301(1).

In some instances, when a processor 102 requests access to data, if that data is in the memory having worse access characteristics 301(1), the operating system 212 initiates a migration of the data from the memory having worse access characteristics 301(1) to the memory having better access characteristics 301(2). This transfer involves moving the data, updating the page tables 310, and issuing TLB shootdowns. Such transfers do not always occur in response to a request to access data in the memory having worse access characteristics 301(1) and other techniques for handling such requests are possible. For instance, in some situations, the operating system 301(1) migrates data in the above-described manner only after a threshold number of requests to access that data have been received. For example, if the threshold is 5, then the operating system 212 migrates the data only after 5 requests to access that data have been received.

More specifically, the operating system 212 transmits a request to the memories 301 to copy the data from the memory having worse access characteristics 301(1) to the memory having better access characteristics 301(2). The operating system 212 also transmits a request to update the mapping(s) for the data, in the page tables 310. This update modifies the virtual-to-physical address translation(s) for the pages of the migrated data to point to destination physical address for the migrated pages instead of the source physical address for the migrated pages. If the memory having better access characteristics 301(2) has no available capacity, then the operating system 212 also selects data to be evicted from the memory having better access characteristics 301(2). The operating system 212 performs a migration operation for that selected data, moving that data to another memory such as back out to the memory having worse access characteristics 301(1). As with the migration to the memory having better access characteristics 301(2), the eviction of the data to the memory having worse access characteristics 301(1) includes modifying the page tables 310 to include the correct translation(s) for the evicted data.

When a migration occurs, the operating system 212 also transmits TLB shootdowns to the TLBs 204. TLB shootdowns cause the entries in a TLB 204 to be invalidated. The purpose of the TLB shootdown is to prevent translations that are cached in the TLB 204 but that are stale from cause a processor 102 to access memory incorrectly.

Based on the above discussion, it is clear that a migration of data represents a significant amount of overhead. More specifically, each migration is associated with TLB shootdowns, which clear the TLBs 204 for the various processors 102. Recovering from a TLB shootdown 204 involves refilling the TLB 204 with translations from the page tables 310, which typically consumes a large amount of time associated with performing page table walks. In addition, each time a migration occurs, the operating system 212 performs the actions described herein, so that processing time that would be assigned to an application is instead used by the operating system 212 for the migration each time a migration occurs.

Due to the above-described overhead, it is desirable to reduce the number of migrations that occur. To reduce the number of migrations, the operating system 212 performs migrations according to a per-application migration granularity that is dynamically adjustable based on application characteristics at runtime. The migration granularity dictates the number of memory pages, contiguous in virtual memory space, that are migrated with each migration. In various examples, the migration granularity can specify that data corresponding to one page worth, sixteen pages worth, or 512 pages worth of the virtual memory address range is migrated when data in the memory having worse access characteristics 301(1) is read, thus causing a migration to trigger. The migration may also trigger in other situations, such as, without limitation, when the operating system 212 predicts that data in the memory having worse access characteristics 301(1) will be used in the near future and would thus be better placed in the memory having better access characteristics 301(2). The migration may also trigger for other reasons as well.

In one implementation, the migration granularity is specified on a per-application basis. In another implementation, one or more migration granularities are specified for each application, with each migration granularity applying to a different portion of the memory space assigned to that application and each migration granularity being dynamically adjustable based on application characteristics at runtime. Herein, the term "per-application migration granularity" refers either to a migration granularity specified for a whole application or for different memory spaces assigned to different applications. Thus, each application may have one or more per-application migration granularities. Varying the granularity dynamically at runtime provides performance benefits that are based on memory access patterns by an application. More specifically, a finer granularity allows for a more precise placement of data into the memory having better access characteristics 301(2), thereby potentially reducing inefficient use of the memory having better access characteristics 301(2) through unnecessary placement of data into that memory, while a coarser granularity allows for lower migration overhead. Selection of an appropriate migration granularity thus affects memory performance.

In FIG. 3, three different migration granularities 313 are illustrated. These different virtual memory migration granularities 313 represent the different-sized portions of memory that are migrated. A size 1 migration granularity 313(1) includes only a single memory page. If the migration granularity is one memory page, then one page of data is migrated for a single migration. A size 2 migration granularity 313(2) includes two memory pages. For a migration granularity of this size, a single migration causes two memory pages that are contiguous in the virtual memory address space to migrate. A size 3 migration granularity 313(3) includes four memory pages. For a migration granularity of this size, a single migration causes four memory pages that are contiguous in the virtual memory address space to migrate. It should be understood that the specific number of memory pages illustrated for the different virtual memory migration granularities are illustrative and that migration granularities having any number of memory pages could be used.

In FIG. 3, a single migration is illustrated for a migration granularity of four pages. The migration causes memory pages having virtual page numbers 312(1)-312(4) to be migrated from the memory having worse access characteristics 301(1) to the memory having better access characteristics 301(2). The operating system 212 moves the data from physical page number ("PPN") 302(1), PPN 302(8), PPN 302(9), and PPN 302(11) in the memory having worse access characteristics 301(1) to PPN 302(21), PPN 302(26), PPN 302(27), and PPN 302(32), respectively, in the memory having better access characteristics 301(2). In addition, the operating system 212 issues TLB shootdowns to the TLBs 204 of the memory management system 120. The above operations constitute a single migration. For any particular TLB 204, the operating system 212 issues a single TLB shootdown for a single migration. The TLBs 204 that are sent a single TLB shootdown may include all TLBs 204 or a subset of TLBs 204, but each TLB 204 that receives a TLB shootdown receives only one TLB shootdown per migration.

Figure 4:
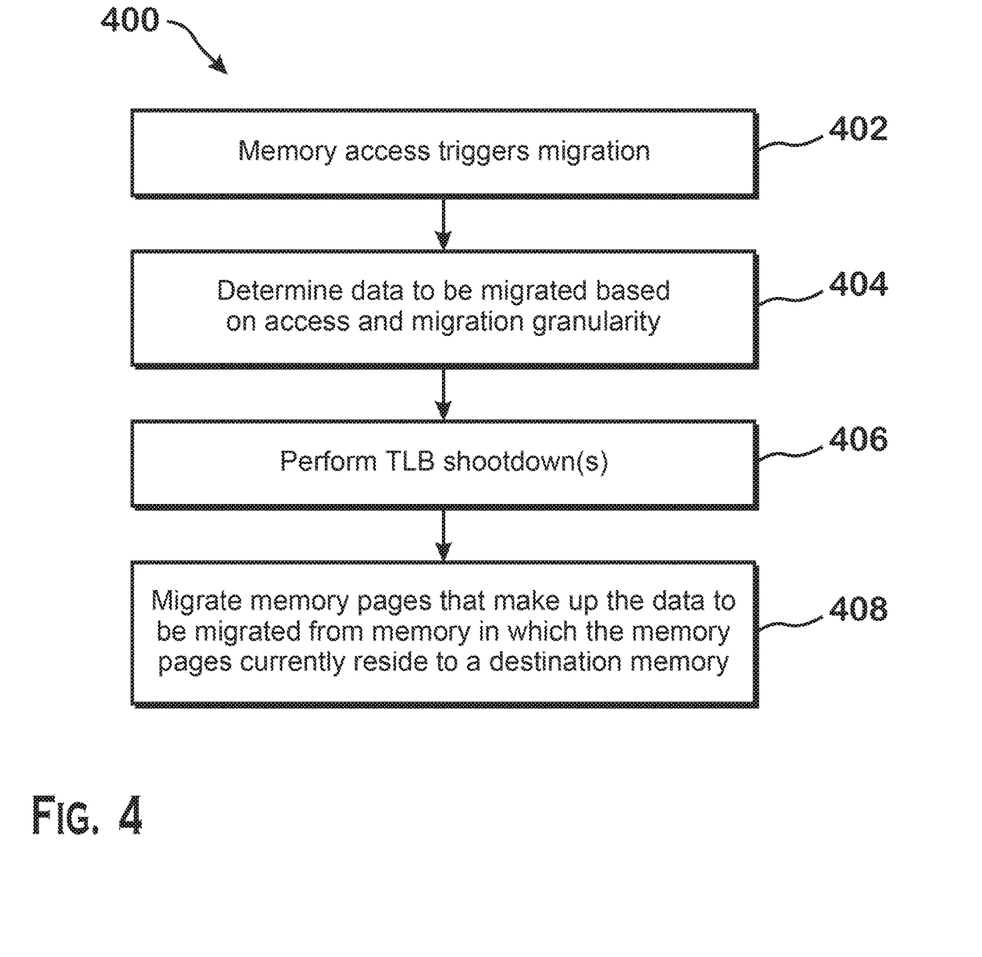
FIG. 4 is a flow diagram of a method for migrating, using a migration granularity, memory pages between memories having different access characteristics, according to an example.

FIG. 4 is a flow diagram of a method 400 for migrating, using a migration granularity, memory pages between memories having different access characteristics, according to an example. Although described with respect to the system shown and described with respect to FIGS. 1-3, it should be understood that any system configured to perform the method, in any technically feasible order, falls within the scope of the present disclosure.

As shown, the method 400 begins at step 402, where a migration is triggered. The trigger can be a memory access or another action such as the operating system 212 determining that data should be migrated response to a prediction that a the data is going to be used in the near future or for some other reason. In one example, one of the processors 102 or another unit in the device 100 requests access to data stored in memory 104. In response, the operating system 212 determines that a migration of the requested data is to be performed for the memory access request. One reason that such a migration would be performed is because the data is stored in a memory having worse access characteristics 301(1) and that the data can be moved to a memory having better access characteristics 301(2). In one example, the data is stored in a high capacity, high latency memory, but can be moved to a memory having lower capacity but lower latency. One example technique for notifying the operating system 212 that an access to a particular memory is made is through the use of memory access permissions and memory access fault handlers. In such an example, the operating system 212 operates in a scheme in which data stored in a memory having worse access characteristics 301(1) is stored with access permissions specified as not being allowed. In such a scheme, reading from or writing data to the memory having worse access characteristics 301(1) is not allowed and thus triggers an access fault, which causes the operating system 212 to execute an access fault handler. This access fault handler then performs subsequent steps to migrate the data for which access is requested.

At step 404, the operating system 212 determines data to be migrated based on the memory access and on the migration granularity. The migration granularity is dynamically determined at runtime based on application characteristics. The data to be migrated is a range of memory pages that are contiguous in virtual memory space and that encompass the accessed data. For example, in FIG. 3, if the data accessed has a virtual address with virtual page number 312(2), one chunk of data to be migrated is in accordance with the size 2 migration granularity 313(2), which includes two memory pages having virtual page number 312(1) and virtual page number 312(2). Another chunk of data to be migrated is in accordance with the size 3 migration granularity 313(3), which includes four memory pages having virtual page number 312(1), virtual page number 312(2), virtual page number 312(3), and virtual page number 312(4). In some examples, the data to be migrated is aligned based on the migration granularity. More specifically, the data to be migrated begins at a virtual memory address where the least significant bits are all zeroes for the bits of the memory address that specify the memory address to a finer degree than the size of the migration granularity. For example, if the migration granularity is 2 megabytes, then being aligned based on the migration granularity means that the least significant bits of the virtual memory address that specify offsets in memory more specific than 2 megabyte chunks are all zeroes.

At step 406, the operating system 212 performs TLB shootdowns. The operating system 212 transmits the TLB shootdowns to TLBs 204 for each of the processors 102 so that the processors 102 do not improperly translate virtual memory addresses using stale translations. At step 408, the operating system 212 migrates memory pages that make up the data to be migrated from a source to a destination. The source is the memory having worse access characteristics 301(1) and the destination is the memory having better access characteristics 301(2). If the memory having better access characteristics 301(2) does not having enough free space for the incoming memory pages, then step 408 also involves the operating system 212 selecting one or more memory pages to move out to the memory having worse access characteristics 301(1). In the scheme in which the operating system 212 is notified of accesses to the memory having worse characteristics 301(1) using access faults, the operating system 212 also sets the access permissions for the memory pages written out to the memory having worse characteristics 301(1), such that accesses to those memory pages cause an access fault and trigger the access fault handler in the operating system 212. Also at step 408, the operating system 212 modifies the page tables 310 such that the virtual page numbers 312 for the migrated memory pages no longer point to the physical pages in the source but instead point to the physical pages in the destination.

The migration granularity is dynamically set on a per-application basis (noting that each application may have more than one migration granularity, where each migration granularity is specified for a different address range for the application). As described above, this granularity identifies the number of memory pages, contiguous in the virtual memory address space, that are migrated in any particular migration operation. The operating system 212 dynamically adjusts migration granularities to be made coarser or finer depending on the situation. The benefit of a coarser migration granularity (i.e., a larger amount of memory) being migrated for each migration is that less overhead is incurred per amount of memory migrated. More specifically, each migration incurs the overhead associated with a TLB shootdown being sent to the TLBs. With a coarser migration granularity, fewer TLB shootdowns are sent to the TLBs per page of data migrated than with a finer migration granularity. Additionally, with a coarser migration granularity, because each migration migrates more data, the operating system 212 overhead is reduced per page of data migrated because the overhead associated with issuing the migration commands, TLB shootdowns, and page table modifications is amortized across more data. The downside to a coarser migration granularity is that due to the limited capacity of the memory having better access characteristics 301(2), migrating more memory pages into the memory having better access characteristics 301(2) results in more pages being migrated out of the memory having better access characteristics 301(2). This migration out results in memory pages that would otherwise be available for use by applications in the memory having better access characteristics 301(2) being instead in the memory having worse access characteristics 301(1), resulting in lowered performance due to increased access latency and/or other associated delay. In general, a coarser migration granularity is beneficial for applications that access data that is contiguous in virtual memory. The benefit in this scenario is that a larger granularity reduces the migration overhead for a large amount of data that is likely to be used. By contrast, for data that is fragmented in virtual memory, may benefit more from a finer migration granularity, as with fragmented data, a large migration would bring unused data into the memory having better access characteristics 301(2) and by evicting useful data from the memory having better access characteristics 301(2) to the memory having worse characteristics 301(1).

Figure 5A:
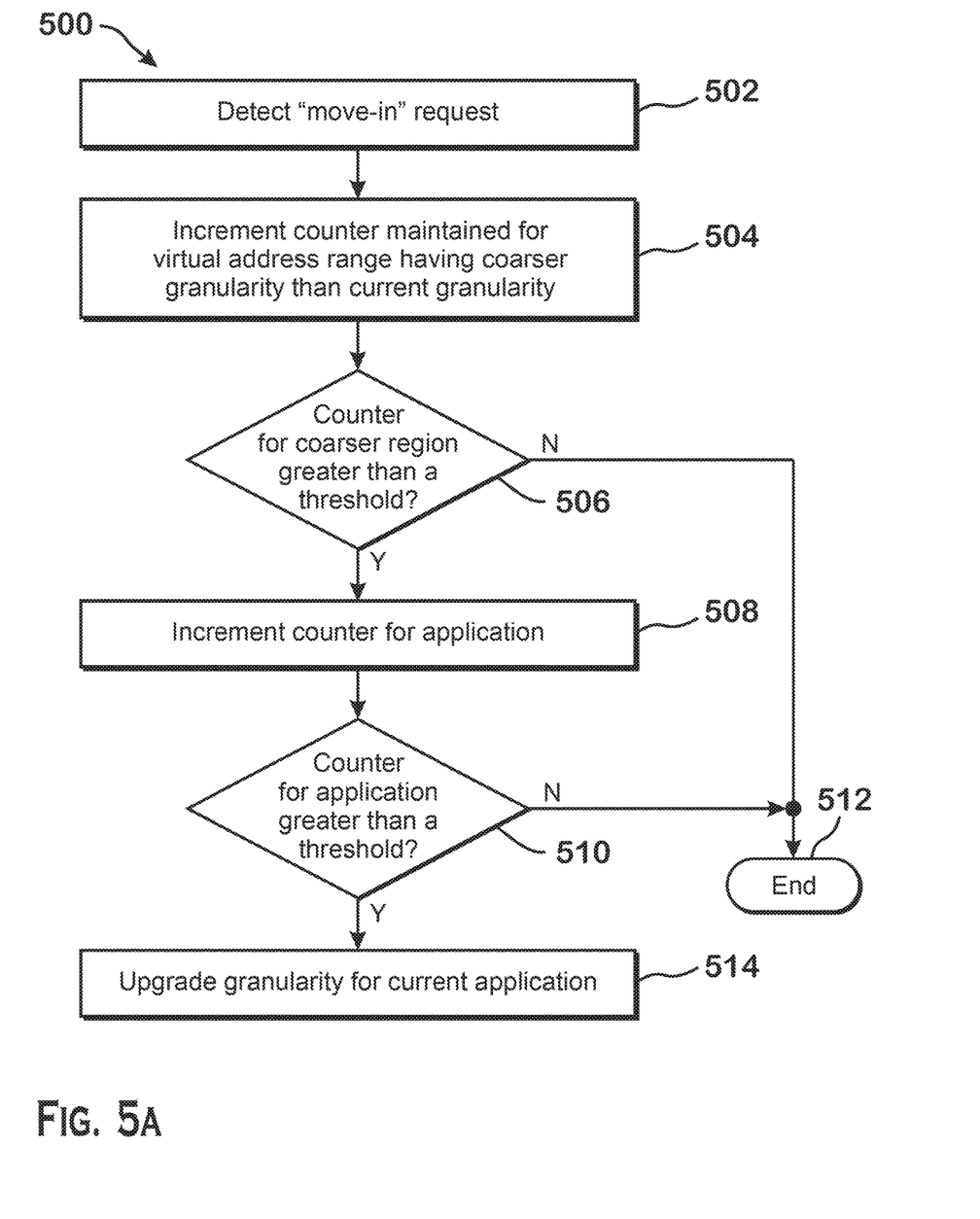
FIGS. 5A and 5B are flow diagrams of methods for selecting migration granularity using a history-based technique.
Figure 5B:
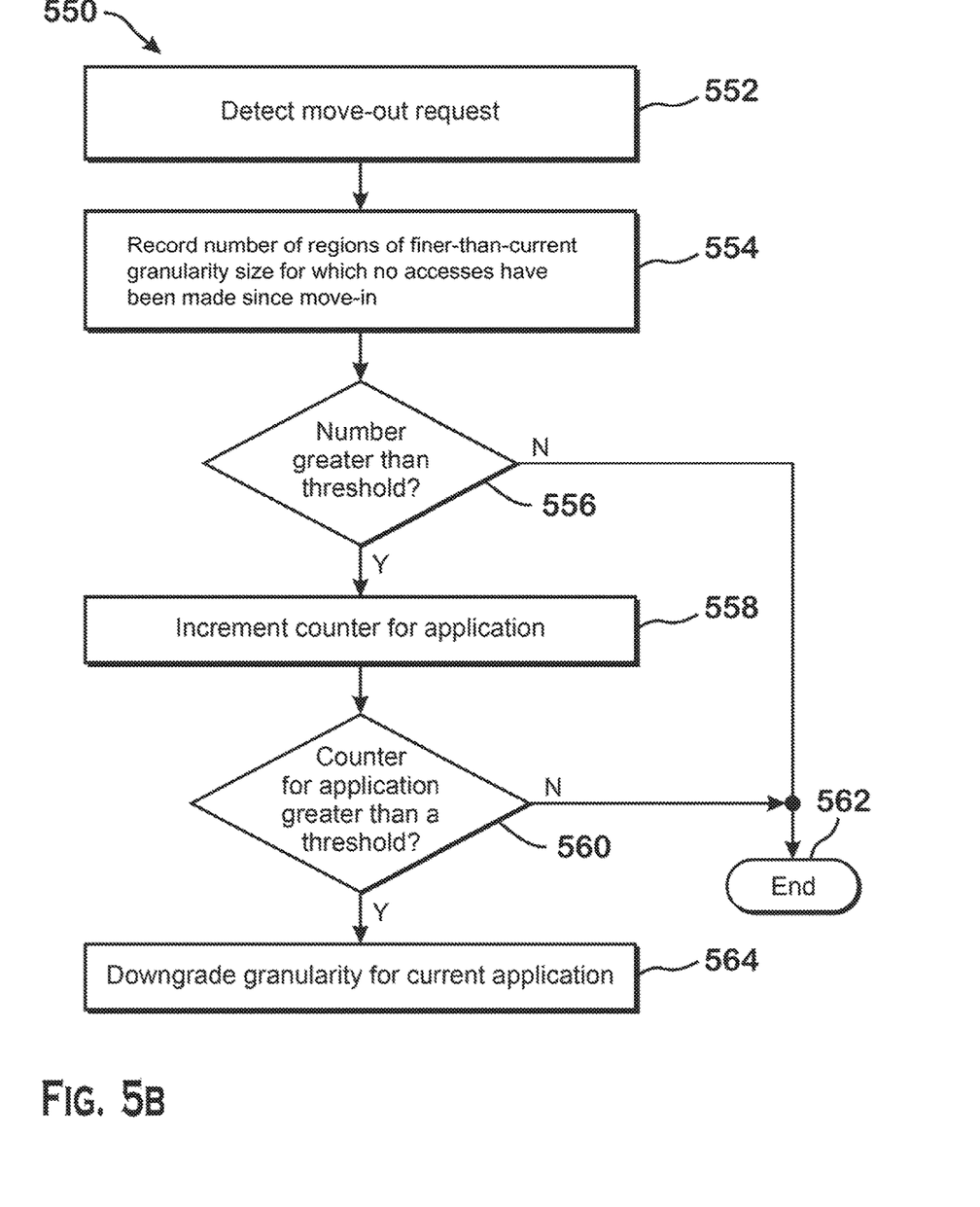
Figure 6:
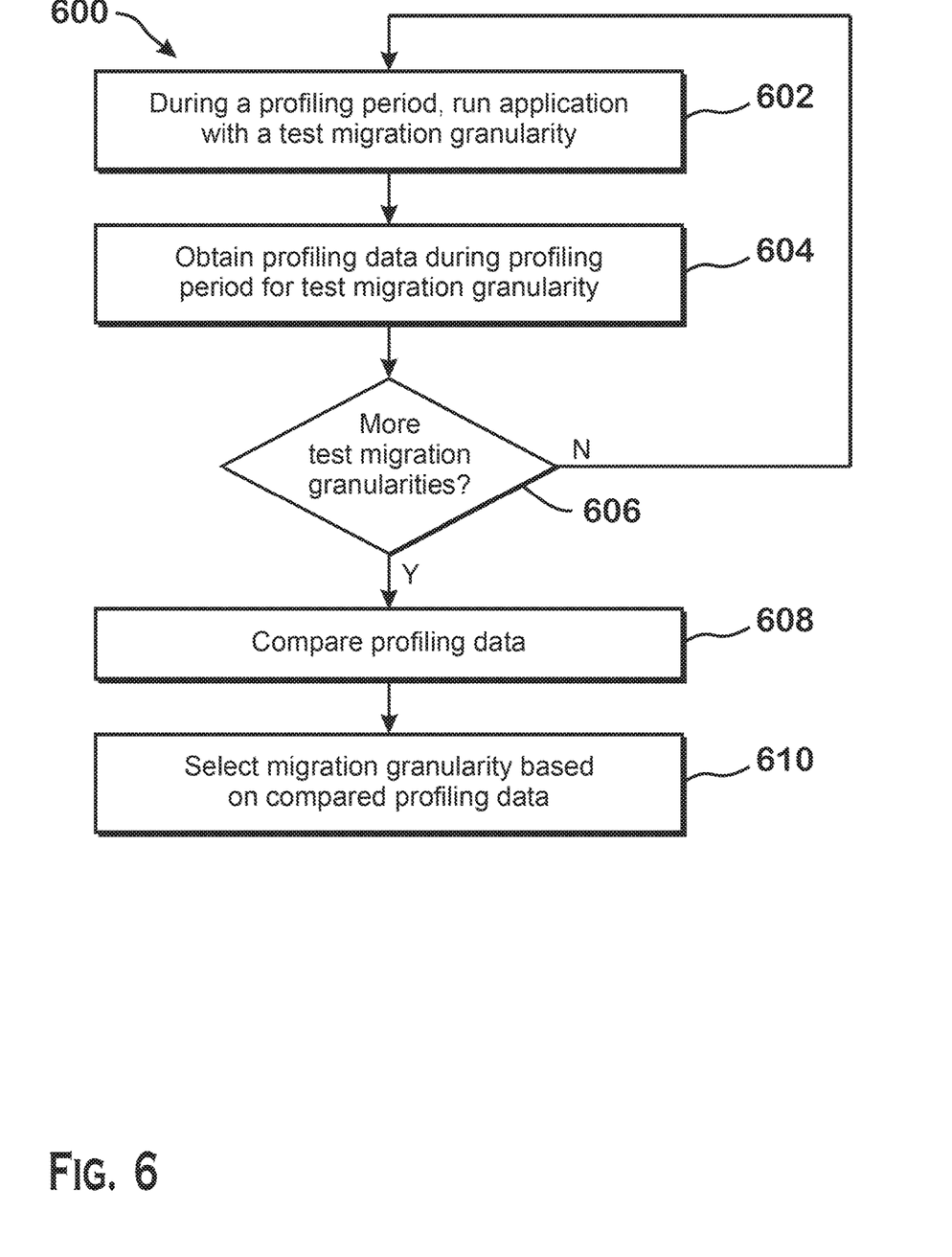
FIG. 6 is a flow diagram of a method for selecting migration granularity using a profiling-based technique.

For the above reasons, selecting an appropriate migration granularity that balances reduced overhead with maintaining relevant data in the memory having better access characteristics 301(2) is important. FIGS. 5A, 5B and 6 illustrate example methods for dynamically selecting a migration granularity. More specifically, FIGS. 5A and 5B illustrate a history-based technique for selecting a migration granularity and FIG. 6 illustrates a profiling-based technique for selecting a migration granularity.

FIG. 5A is a flow diagram of a method 500 for selecting migration granularity in response to a "move-in" request, according to an example. Although described with respect to the system shown and described with respect to FIGS. 1-3, it should be understood that any system configured to perform the method, in any technically feasible order, falls within the scope of the present disclosure.

As shown, the method 500 begins at step 502, where the operating system 212 detects a move-in request. A move-in request is a request to migrate memory pages from a memory having worse access characteristics 301(1) to a memory having better access characteristics 301(2). In one example, such a request is detected in response to an access fault occurring in the memory having worse access characteristics 301(1), since access flags for that memory are set to indicate that no access is allowed. In other examples, any technically feasible technique for notifying the operating system 212 that a move-in is to occur can be used.

At step 504, the operating system 212 increments a counter maintained for the virtual memory address range, in the virtual memory space, that includes the data for which the move-in request is being performed, where the counter is maintained for a granularity that is coarser than the current migration granularity of the application whose memory access triggered the move-in request. More specifically, the operating system 212 maintains a set of counter for each application, and for a variety of ranges in the virtual memory address space, where the ranges each cover a range of addresses that is at a granularity that is coarser than the current granularity for the application. In one example, the migration granularity for an application is 4 kilobytes (kB) and a migration granularity that is coarser than that is 2 megabytes (MB). In this example, the operating system 212 maintains counters for different 2 MB address ranges in the virtual memory address space. In one example, each 2 MB-aligned 2 MB address range in the virtual memory address space has a separate counter. In another example, the operating system 212 uses a hash function to hash an identifier for different 2 MB-aligned 2 MB address ranges to a value smaller than the 2 MB-address range identifier, such that different 2 MB-address ranges share counters. The purpose of this hash is to reduce the amount of space needed for the counters. Collisions may occur but are considered unlikely, and the benefits of selecting an appropriate migration granularity outweigh the drawbacks of the occasional collision. The purpose of maintaining these counters is to keep track of the number of times that data within an address range of a coarser granularity than the current granularity of the application is moved in to the memory having better access characteristics 301(2). This information is indicative of whether the application should switch to a coarser granularity. More specifically, if too many move-ins within a particular virtual memory address range of a migration granularity coarser than the application's current migration granularity occur, then that indicates that the coarser migration granularity, which would incur less total overhead, would result in better performance.

At step 506, the operating system 212 determines whether a counter for a range of virtual memory addresses that is coarser than the current migration granularity is greater than a threshold. As just described above, if the counter for a particular coarser migration granularity is greater than a threshold, this indicates that the application would perform better with a coarser migration granularity. The threshold can be selected in any technically feasible manner. In one example, the threshold is a fixed percentage of the number of finer migration granularity address ranges in the coarser migration granularity address range (e.g., the number of 4 kB ranges in a 2 MB range, which equals 256). In another example, the threshold is pre-programmed or dynamically modifiable. In other examples, the threshold can be selected in any technically feasible manner. If the counter for the coarser migration granularity is greater than the threshold, then the method 500 proceeds to step 508 and if the counter for the migration granularity is not greater than the threshold, then the method 500 proceeds to step 512, where the method 500 ends.

At step 508, the operating system 212 increments a counter for the application. This counter indicates the number of times that the counter for a particular coarser-granularity region was incremented (step 506). The purpose of this application-wide counter is to keep track of the number of times that any particular coarser-granularity region is determined to have had "too many" move-in requests (step 506). At step 510, the operating system 212 determines whether the per-application counter is greater than a threshold. If the per-application counter is greater than the threshold, then the method 500 proceeds to step 514 and if the per-application counter is not greater than the threshold, then the method 500 proceeds to step 512, where the method 500 ends. The threshold can be chosen in any technically feasible manner. At step 514, because the per-application counter is greater than the threshold, the operating system 212 upgrades (makes coarser) the migration granularity for the current application. In this situation, the migration granularity has been upgraded because the number of regions for which too many move-in requests have been made is above a threshold and thus the operating system 212 has determined that a coarser migration granularity would improve performance due to a reduced overall overhead associated with the migrations.

FIG. 5B is a flow diagram of a method 550 for selecting migration granularity in response to a "move-out" request, according to an example. Although described with respect to the system shown and described with respect to FIGS. 1-3, it should be understood that any system configured to perform the method, in any technically feasible order, falls within the scope of the present disclosure.

As shown, the method 550 begins at step 552, where the operating system 212 detects a move-out request. A move-out request is a request to migrate memory pages from a memory having better access characteristics 301(2) to a memory having worse access characteristics 301(1). In one example, a move-out request occurs in response to a move-in operation, where the memory having better access characteristics 301(2) does not have sufficient unallocated space for the data being "moved in." In this situation, the operating system 212 determines that data is to be moved out from the memory having better access characteristics 301(2) to the memory having worse access characteristics 301(1) in order to make room for the data being moved in. Data can be selected for move out from the memory having better access characteristics 301(2) according to any technically feasible replacement technique such as least-recently-used or any other replacement technique. Move-out requests may occur for other reasons as well.

At step 554, the operating system 212 records the number of regions of finer-than-current granularity size for which no accesses have been made since move-in, within the current-granularity range of virtual memory addresses selected for move-out. More specifically, the operating system 212 selects for move out data having the migration granularity specified for the application that triggered the move out. For example, if the migration granularity is 2 MB, then the operating system 212 examines 2 megabytes of data that is contiguous in the virtual memory address space. The operating system 212 determines which portions of that 2 MB of data have not been accessed (e.g., read or written) since being moved into the memory having better access characteristics 301(2), where the "portions" are of a size that is finer than the current migration granularity of the application (e.g., if the current migration granularity is 2 MB, then the finer size may be 4 kB).

In one example, detecting whether data has been accessed is done using access bits in page tables 310. More specifically, when data is moved into the memory having better access characteristics 301(2), the operating system 212 clears the access bit for that data. If the data is then accessed, the memory management system 120 automatically sets the access bit. To perform step 554, the operating system 212 examines the access bits for the memory pages in the region having the migration granularity.

At step 556, the operating system 212 determines whether the number of finer-granularity portions that have not been accessed since move-in is greater than a threshold. The threshold can be set or modified in any technically feasible manner. In one example, the threshold is a fixed percentage of the total number of finer-granularity portions in the current migration granularity (e.g., if the current migration granularity is 2 MB and the finer-granularity portions are 4 kB each, then the threshold is a fixed percentage of 256). In other examples, any technically feasible technique for determining the threshold can be used. If the number of finer-granularity portions that have not been accessed since move-in is greater than the threshold, then the method 550 proceeds to step 558 and if the number of finer-granularity portions that have not been accessed since move-in is not greater than the threshold, then the method 550 proceeds to step 562, where the method 550 ends.

At step 558, the operating system 212 increments a per-application counter. The purpose of this counter is to determine how many times the condition of step 556 occurs—i.e., the number of times that finer-granularity portions that have not been accessed since move-in is greater than a threshold. At step 560, if this counter is greater than a threshold, then the method 550 proceeds to step 564 and if the counter is not greater than the threshold, then the method 550 proceeds to step 562. This threshold can be determined in any technically feasible manner, such as being pre-set, or being dynamically determined based on a variety of operating characteristics. At step 564, in response to the counter being greater than the threshold, the operating system 212 downgrades (makes finer) the migration granularity for the current application.

In the above discussions for FIGS. 5A and 5B, any time a counter goes above a threshold, that counter is reduced to 0.

FIG. 6 is a flow diagram of a method 600 for selecting migration granularity using profiling, according to an example. Although described with respect to the system shown and described with respect to FIGS. 1-3, it should be understood that any system configured to perform the method, in any technically feasible order, falls within the scope of the present disclosure.

The method 600 is an alternative to the method 500 and the method 550. As shown, the method 600 begins at step 602, where the operating system 212, in a profiling period, runs an application with a test migration granularity. A profiling period is a portion of time set out for profiling the application to determine which migration granularity to use. In an example, the profiling period is 10 microseconds every second. However, the teachings herein are not limited to such profiling period, which may be any technically feasible period of time. As described in further detail below, the operating system 212 varies the test migration granularity to obtain profiling data for the migration granularities being analyzed.

At step 604, the operating system 212 obtains profiling data during the profiling period for the test migration granularity. The profiling data includes information that indicates (directly or indirectly) memory access performance with respect to the data being accessed in the memory 104. In one example, the profiling data includes the number of TLB shootdowns issued. Because a TLB shootdown is sent each time a migration occurs, and because the same number of TLB shootdowns is triggered for the same number of migration operations, regardless of migration granularity, migrating data at a coarser granularity causes fewer TLB shootdowns to occur for the same amount of data migrated. However, more migrations will occur if the selected migration granularity is "wrong" for the current application memory access pattern. For example, if the migration granularity is very coarse, but the application uses only small, spaced out portions of data, then the memory having better access characteristics 301(2) will be filled mostly with unused data, which would increase the number of migrations that would need to occur to bring needed data into the memory having better access characteristics 301(2). For these reasons, the number of TLB shootdowns that occur is a good proxy for memory performance.

At step 606, the operating system 212 determines whether there are more test migration granularities to use. If there are more migration granularities, then the method 600 returns to step 602 and if there are not more migration granularities, then the method proceeds to step 608. As described above, the operating system 212 compares performance for a number of different test migration granularities. Steps 602 through 606 represent the operating system 212 iterating over the different migration granularities to obtain profiling data for the different migration granularities.

At step 608, the operating system 212 compares the profiling data for the different migration granularities. At step 610, the operating system 212 selects a migration granularity for the application for which the testing was performed, based on the profiling data. The operating system 212 selects the migration granularity that produced the "best" results during the profiling period. In the example in which the number of TLB shootdowns is used as the profiling data, the operating system 212 selects the migration granularity that resulted in the fewest TLB shootdowns. This selected migration granularity is used as the current migration granularity for the application, such that migrations (move-ins and move-outs) occur at that granularity.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for migrating data between a first memory and a second memory, the method comprising:
   dynamically adjusting a migration granularity for an application based on characteristics of the application;
   identifying subject data for migration;
   identifying a portion of data to migrate based on the subject data and on the migration granularity, the migration granularity specifying the portion of data to migrate as a number of memory pages forming a contiguous range of virtual addresses and including the subject data;
   performing, for a translation lookaside buffer, one translation lookaside buffer shootdown; and
   migrating, in a single migration operation, the portion of data to migrate, from a source memory, in which the memory pages of the portion of data reside, to a destination memory,
   wherein migrating the portion of data comprises a move-in operation, and dynamically adjusting the migration granularity comprises:
      first tracking of move-in operations for a virtual address range having a coarser granularity than the migration granularity, and second tracking of move-in operations for the application,
      responsive to determining, based on the first tracking and the second tracking, that a condition is satisfied, upgrading the migration granularity.

2. The method of claim 1, wherein determining, based on the first tracking and the second tracking, that a condition is satisfied comprises:
 determining that a tracked number of move-in operations for the virtual address range is above a first threshold; and
 determining that a tracked number for move-in operations for the application is above a second threshold.

3. The method of claim 2, wherein:
 dynamically adjusting the migration granularity is performed according to a history-based technique;
 migrating the portion of data comprises a move-in operation; and
 dynamically adjusting the migration granularity according to a history-based technique comprises, responsive to determining that the move-in operation is to be performed:
  incrementing a counter for a virtual address range having a coarser granularity than a migration granularity for an application from which the memory access originated,
  if the counter for the virtual address range is above a first threshold, then incrementing a counter for the application and if the counter for the virtual address range is not above the first threshold, then maintaining the value of the counter for the virtual address range, and
  if the counter for the application is above a second threshold, then upgrading the migration granularity for the application, and if the counter for the application is not above the second threshold, then maintaining the migration granularity for the application.

4. The method of claim 3, further comprising:
 performing a move-out operation to move data from the destination memory to the source memory in order to make room for the memory pages of the portion of data; and
 dynamically adjusting the migration granularity based on a history-based technique further comprises responsive to determining that the move-out operation is to be performed:
  recording a number of memory address ranges of finer-than-current migration granularity for the application for which no access has been made since data for those memory address ranges were moved in,
  if the number of memory address ranges of finer-than-current migration granularity is greater than a third threshold, then incrementing a second counter for the application and if the number is not greater than the third threshold, then maintaining the value of the second counter for the application, and
  if the second counter is greater than a fourth threshold, then downgrading the migration granularity for the application, and if the second counter for the application is not above the fourth threshold, then maintaining the migration granularity for the application.

5. The method of claim 1, wherein the migration granularity is specified on a per-application basis.

6. The method of claim 1, wherein dynamically adjusting the migration granularity is performed according to a profiling technique.

7. The method of claim 6, wherein dynamically adjusting the migration granularity according to the profiling technique comprises:
 during a profiling period, causing an application to run with different test migration granularities;
 recording profiling data for the application with the different test migration granularities; and
 selecting a migration granularity based on the profiling data for the different test migration granularities.

8. The method of claim 7, wherein:
 the profiling data comprises data indicating a number of translation lookaside buffer shootdowns that occur for the application run with the different test migration granularities; and
 selecting the migration granularity comprises selecting a migration granularity, of the test migration granularities, for which the fewest translation lookaside buffer shootdowns occurred.

9. The method of claim 1, wherein the destination memory has lower latency and lower capacity than the source memory.

10. A non-transitory computer-readable medium storing instructions that, when executed by a processor, cause the processor to migrate data between a first memory and a second memory by:
 dynamically adjusting a migration granularity for an application based on characteristics of the application;
 identifying subject data for migration;
 identifying a portion of data to migrate based on the subject data and on the migration granularity, the migration granularity specifying the portion of data to migrate as a number of memory pages forming a contiguous range of virtual addresses and including the subject data;
 performing, for a translation lookaside buffer, one translation lookaside buffer shootdown; and
 migrating, in a single migration operation, the portion of data to migrate, from a source memory, in which the memory pages of the portion of data reside, to a destination memory,
 wherein migrating the portion of data comprises a move-in operation, and dynamically adjusting the migration granularity comprises:
 first tracking of move-in operations for a virtual address range having a coarser granularity than the migration granularity, and second tracking of move-in operations for the application,
 responsive to determining, based on the first tracking and the second tracking, that a first condition is satisfied, upgrading the migration granularity.

11. The non-transitory computer-readable medium of claim 10, wherein the destination memory has lower latency and lower capacity than the source memory.

12. A computing system, comprising:
 a source memory;
 a destination memory; and
 an operating system configured to:
  dynamically adjust a migration granularity for an application based on characteristics of the application;
  identify subject data for migration;
  identify a portion of data to migrate based on the subject data and on the migration granularity, the migration granularity specifying the portion of data to migrate as a number of memory pages forming a contiguous range of virtual addresses and including the subject data;
  perform, for a translation lookaside buffer, one translation lookaside buffer shootdown; and
  migrate, in a single migration operation, the portion of data to migrate, from the source memory, in which the memory pages of the portion of data reside, to the destination memory, wherein migrating the portion of data comprises a move-in operation, and dynamically adjusting the migration granularity comprises:
- first tracking of move-in operations for a virtual address range having a coarser granularity than the migration granularity, and second tracking of move-in operations for the application,
- responsive to determining, based on the first tracking and the second tracking, that a condition is satisfied, upgrading the migration granularity.

13. The computing system of claim 12, wherein determining, based on the first tracking and the second tracking, that a condition is satisfied comprises:
- determining that a tracked number of move-in operations for the virtual address range is above a first threshold; and
- determining that a tracked number for move-in operations for the application is above a second threshold.

14. The computing system of claim 13, wherein:
- the operating system is configured to dynamically adjust the migration granularity according to a history-based technique;
- migrating the portion of data comprises a move-in operation; and
- the operating system is configured to dynamically adjust the migration granularity according to a history-based technique by, responsive to determining that the move-in operation is to be performed:
  - incrementing a counter for a virtual address range having a coarser granularity than a migration granularity for an application from which the memory access originated,
  - if the counter for the virtual address range is above a first threshold, then incrementing a counter for the application and if the counter for the virtual address range is not above the first threshold, then maintaining the value of the counter for the virtual address range, and
  - if the counter for the application is above a second threshold, then upgrading the migration granularity for the application, and if the counter for the application is not above the second threshold, then maintaining the migration granularity for the application.

15. The computing system of claim 14, wherein the operating system is further configured to:
- perform a move-out operation to move data from the destination memory to the source memory in order to make room for the memory pages of the portion of data; and
- dynamically adjust the migration granularity based on a history-based technique by, responsive to determining that the move-out operation is to be performed:
  - recording a number of memory address ranges of finer-than-current migration granularity for the application for which no access has been made since data for those memory address ranges were moved in,
  - if the number of memory address ranges of finer-than-current migration granularity is greater than a third threshold, then incrementing a second counter for the application and if the number is not greater than the third threshold, then maintaining the value of the second counter for the application, and
  - if the second counter is greater than a fourth threshold, then downgrading the migration granularity for the application, and if the second counter for the application is not above the fourth threshold, then maintaining the migration granularity for the application.

16. The computing system of claim 12, wherein the migration granularity is specified on a per-application basis.

17. The computing system of claim 12, wherein the operating system is configured to dynamically adjust the migration granularity according to a profiling technique.

18. The computing system of claim 17, wherein the operating system is configured to dynamically adjust the migration granularity according to the profiling technique by:
- during a profiling period, causing an application to run with different test migration granularities;
- recording profiling data for the application with the different test migration granularities; and
- selecting a migration granularity based on the profiling data for the different test migration granularities.

19. The computing system of claim 18, wherein:
- the profiling data comprises data indicating a number of translation lookaside buffer shootdowns that occur for the application run with the different test migration granularities; and
- the operating system is configured to select the migration granularity by selecting a migration granularity, of the test migration granularities, for which the fewest translation lookaside buffer shootdowns occurred.

20. The computing system of claim 12, wherein the destination memory has lower latency and lower capacity than the source memory.

* * * * *